(12) United States Patent
Huber et al.

(10) Patent No.: US 6,752,034 B2
(45) Date of Patent: Jun. 22, 2004

(54) POWERSHIFT REVERSING GEARBOX

(75) Inventors: Tilo Huber, Passau (DE); Fritz Leber, Friedrichshafen (DE); Udo Brehmer, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 9 days.

(21) Appl. No.: 10/185,501

(22) Filed: Jun. 27, 2002

(65) Prior Publication Data
US 2003/0015050 A1 Jan. 23, 2003

(30) Foreign Application Priority Data
Jun. 28, 2001 (DE) ......................................... 101 31 329

(51) Int. Cl.⁷ .............................................. F16H 3/08
(52) U.S. Cl. ............................. 74/331; 74/333; 74/360
(58) Field of Search ........................ 74/331, 325, 329, 74/333, 356, 360

(56) References Cited

U.S. PATENT DOCUMENTS

| | | | |
|---|---|---|---|
| 2,887,201 A | | 5/1959 | Willis .......................... 192/67 |
| 4,245,519 A | * | 1/1981 | Herlitzek ...................... 74/331 |
| 4,392,391 A | * | 7/1983 | Jameson et al. .............. 74/333 |
| 4,771,647 A | * | 9/1988 | Stevens ........................ 74/331 |
| 4,823,639 A | * | 4/1989 | Krause et al. ................. 74/360 |
| 5,249,475 A | * | 10/1993 | McAskill ...................... 74/331 |
| 5,273,499 A | | 12/1993 | Friedl et al. ................. 475/241 |
| 5,471,892 A | * | 12/1995 | Sherman ....................... 74/325 |
| 5,819,587 A | | 10/1998 | Leber et al. .................. 74/331 |
| 6,257,080 B1 | * | 7/2001 | Shin ............................ 74/325 |

FOREIGN PATENT DOCUMENTS

| | | | | |
|---|---|---|---|---|
| DE | 1 178 262 | | 2/1966 | |
| DE | 40 21 653 A1 | | 1/1991 | .......... F16D/11/00 |
| EP | 0 759 129 B1 | | 8/1998 | .......... F16H/3/093 |
| FR | 2805221 A1 | * | 8/2001 | ............ B60K/6/02 |

* cited by examiner

Primary Examiner—Tisha D Lewis
(74) Attorney, Agent, or Firm—Davis & Bujold, PLLC

(57) ABSTRACT

In a powershift multi-gear transmission (1), the countershafts of the reverse gear (KR), of the forward gear (KV) and of the fourth gear (K4) are combined to form one reversing transmission unit (33) and the countershaft units of the first gear (K1), of the second gear (K2) and of the third gear (K3) are combined to form one gear transmission unit (34). The reversing transmission unit (33) is provided on any side of the input shaft (3). The gear transmission unit (34) attaches to the reversing transmission unit (33) so that the reversing transmission unit (33) and the gear transmission unit (34) are disposed in relation to the input shaft (3) in succession upon one side of the input shaft (3). The gear transmission unit (34) is preferably located on the countershaft unit of the reverse gear (KR).

14 Claims, 5 Drawing Sheets

POWERSHIFT REVERSING GEARBOX

FIELD OF THE INVENTION

The invention relates to a multiple gear reversing transmission shiftable under load for construction machinery.

BACKGROUND OF THE INVENTION

Those reversing transmissions are used in many different vehicles in the branch of construction machinery. Typical examples of use are in excavator loaders, fork lift trucks, wheel loaders, material handling machines and also mobile cranes. The multiplicity of vehicles in this field demands a great measure of adaptability of the transmission used, since the installation conditions in the different vehicles can turn up in the most varied ways.

The installation space available, for example, can turn out to be extremely small. Different center distances between the transmission input shaft and the transmission output shaft can also appear. Depending on the type of vehicle, a specific center distance is accordingly needed between the input and output shafts of the transmission. Besides, in most areas of use, at least one auxiliary drive is needed, for example, for the hydraulic system of the mobile machine. The functions that a reversing transmission has to perform are, therefore, very differently conditioned by the type of construction of the vehicle. The requirements must be met within the axial length and width of the transmission.

In EP 0 759 129 B1, a powershift reversing transmission was made known which, by virtue of the distribution of the gear clutches, fixed gears and idler gears among several countershafts, has an input gear set and a distributor gear set with which long and short center distances can be implemented. For long center distances, it is provided to situate the countershafts essentially between the input and the output shafts. Depending on the gear desired, different combinations of countershafts take part here in the transmission of power. In the case of short center distances, the countershafts are positioned in the circle around the input shaft whereby their position, relative to each other, is already predetermined. In the reversing transmission shaft arrangements different from each other are accordingly provided to implement different center distances.

The problem on which this invention is based is to provide a powershift multi-gear reversing transmission that is adaptable to different installation situations, that has a shaft arrangement adequate for bridging different center distances and that requires only a few additional parts in the adaptation to a certain installation situation.

SUMMARY OF THE INVENTION

The invention provides that the individual shafts of the reversing transmission be combined to form a transmission unit (KV, KR, K4) and a gear transmission unit (K1, K2, K3), the reversing transmission unit being provided in any side of the input shaft and the gear transmission unit being attached to the reversing transmission unit so that related to the input shaft the reversing transmission unit and the gear transmission unit is disposed in succession on one side of the input shaft.

The countershaft units can be comprised, for example, of a countershaft, a shifting device and idle and fixed gears. The reversing transmission unit consists of the countershaft unit for the forward gear, the reverse gear and the fourth gear. The gear transmission unit consists of the countershaft units for the first, the second and the third gear. The reversing transmission unit is preferably provided on any place of the periphery of the input shaft while the gear transmission unit is attached to the countershaft unit of the reverse gear.

In this manner, the shafts of the reversing transmission unit and the input shaft, the same as the shafts of the gear transmission unit and the shaft of the reverse gear, are respectively disposed to form a rectangle. The angles of the rectangle can be changed according to the momentary requirements of the specific installation situation.

By the shaft arrangement of the inventive shaft transmission, it is possible to implement both short and long center distances without it being needed to change the relative position to each other of the individual shafts. Only by variation of the distances between the individual shafts and of the angles formed by the connecting lines between two shafts is it possible to consider special standards of a certain vehicle type.

The flexible arrangement of the shafts can be attained without it being necessary to exchange the components that take part in the power flow. A maximum of possibilities for re-use of components is thus ensured.

According to a preferred embodiment of the invention, next to the input shaft, the reversing transmission has an auxiliary output such as a PTO. The installation of the PTO is made possible since, by virtue of the inventive arrangement of both transmission units on one side of the input shaft, there still is sufficient place for a PTO next to the input shaft. An engine-dependent auxiliary output is preferably used.

For vehicles that required from the transmission the bridging of still greater distances, a long distance variant can be provided such as can be implemented with a power divider transmission.

In another preferred embodiment of the invention, the countershaft unit of the fourth gear is placed next to the input shaft independently of the remaining countershaft units. The countershaft unit can also be eliminated from the reversing transmission when necessary. Such a construction is conceivable, for example, for forklift trucks which, as a rule, have only three different gears available. The space gained by the removal of the countershaft unit can be used for a second auxiliary output.

Accordingly, the instant invention makes it possible to consider the most different transmission requirements while retaining the basic transmission draft. Thereby material and costs can be spared and the transmission can be easily serviced. It is also possible to easily adapt an already existing transmission to new requirements.

BRIEF DESCRIPTION OF THE DRAWINGS

The invention is explained in detail herebelow with reference to the drawing which does.

DETAILED DESCRIPTION OF THE INVENTION

Figure 1:
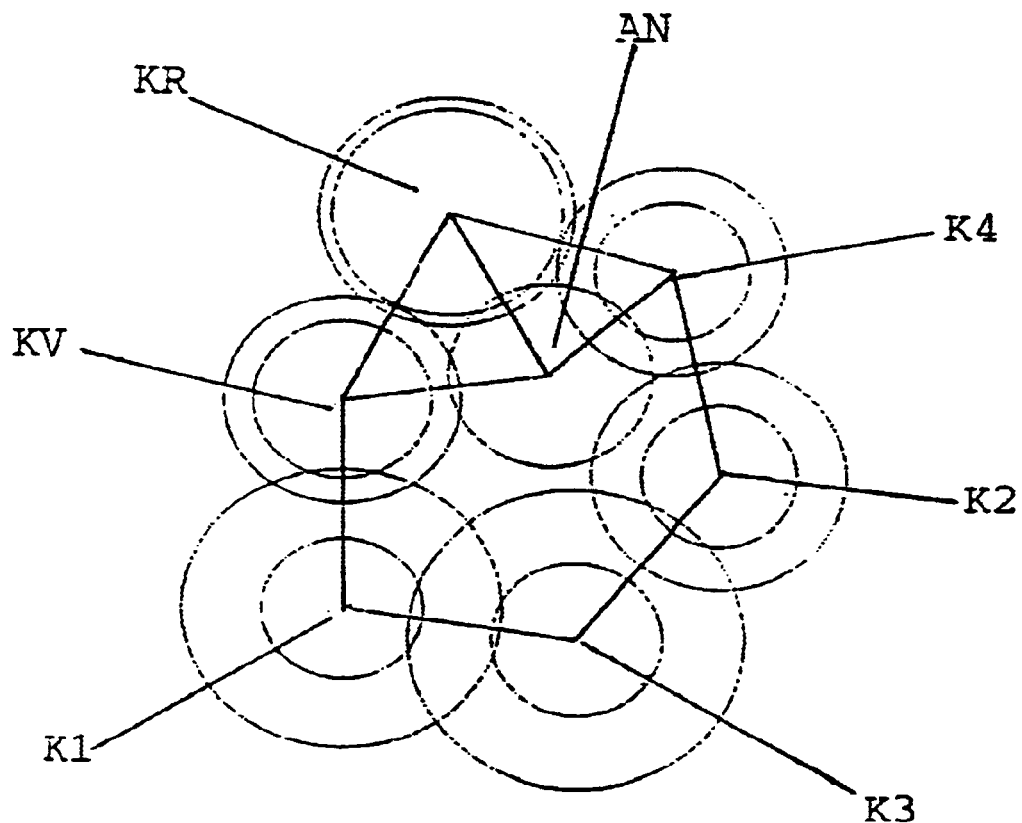
FIG. 1 is a representation of a reversing transmission for short center distances according to the prior art.

According to the prior art, FIG. 1 shows a reversing transmission which is provided for small center distances. The countershafts of the countershaft units for the forward gear KV, the reverse gear KR, the first gear K1, the second gear K2, the third gear K3 and the fourth gear K4 are disposed around the input shaft AN. At the same time, the shaft of the third gear serves as output shaft. In this shaft arrangement little space remains for being able to consider peculiarities of different installation situations since, due to the circular distribution of the transmission shafts, little flexibility is left for a variation of the arrangement.

Figure 2:
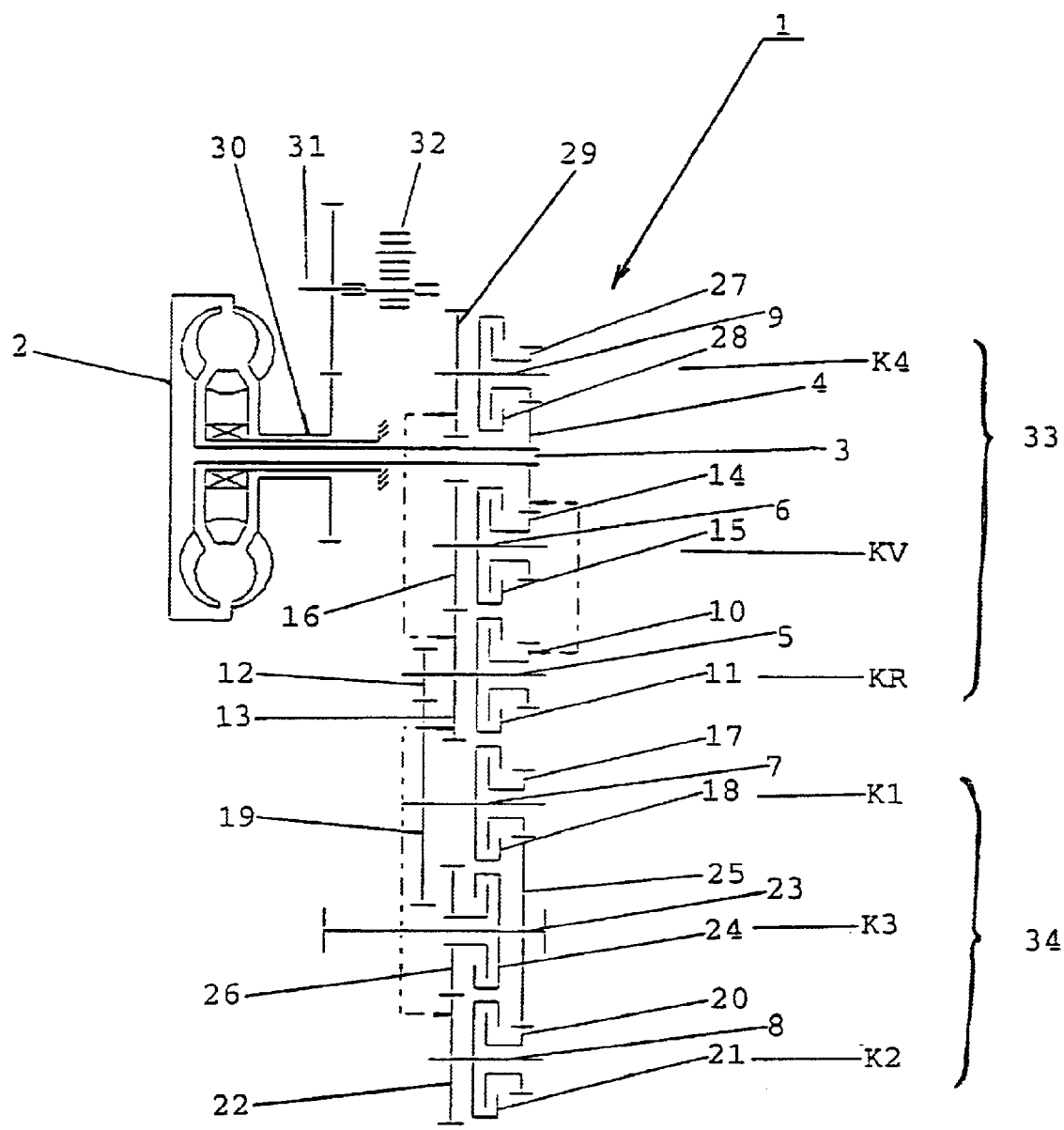
FIG. 2 is a transmission diagram of a reversing transmission according to the instant invention.

FIG. 2 shows a reversing transmission 1, according to the instant invention, where the input power is transmitted by a torque converter 2 to a hollow shaft 3 which constitutes the input shaft. Upon the hollow shaft 3 is placed a fixed gear 4 through which the input power is relayed.

The transmission has countershafts 5, 6, 7 8 and 9 upon which are respectively situated fixed gears, idler gears and clutch elements and with these several countershaft units are formed. The countershaft unit for the reverse gear KR is formed by the countershaft 5, the idler gear 10, the clutch element 11 and the fixed gears 12 and 13. The countershaft unit of the forward gear KV comprises the countershaft 6, the idler gear 14, the clutch element 15 and the fixed gear 16. The countershaft unit for the first gear K1 is formed by the countershaft 7, the idler gear 17, the clutch element 18 and the fixed gear 19. The countershaft unit for the second gear K2 has the countershaft 8, the idler gear 20, the clutch unit 21 and the fixed gear 22. The countershaft unit for the third gear K3 is formed by the output shaft 23, the clutch element 24, the fixed gear 25 and the idler gear 26. The countershaft unit for the fourth gear consists of the countershaft 9, the idler gear 27, the clutch unit 28 and the fixed gear 29. The countershaft unit K4 is preferably placed next to the input shaft 3, the fixed gear 4 meshing with the idler gear 27.

The mode of operation of the gear wheels and clutches for shifting the different gears and the corresponding power flow is well known to the expert. Therefore, it will not be further considered here.

By the torque converter 2 is preferably driven another hollow shaft 30 which serves an auxiliary input 31 situated far in front of the transmission so that a hydraulic pump 32 needed for the vehicle or the transmission can be disposed in parallel with the transmission. The installation space needed for the transmission is thus further reduced by the axial length diminishing to a minimum measure.

The countershaft units KV, KR and K4 form a reversing transmission unit 33 and the countershaft units K1, K2 and K3 form a gear transmission unit 34 wherein the countershaft units of the reversing transmission unit 33 are provided on one side next to the input shaft 3 and the countershaft units of the gear transmission unit attach to the countershaft unit KR of the reverse gear.

Figure 3:
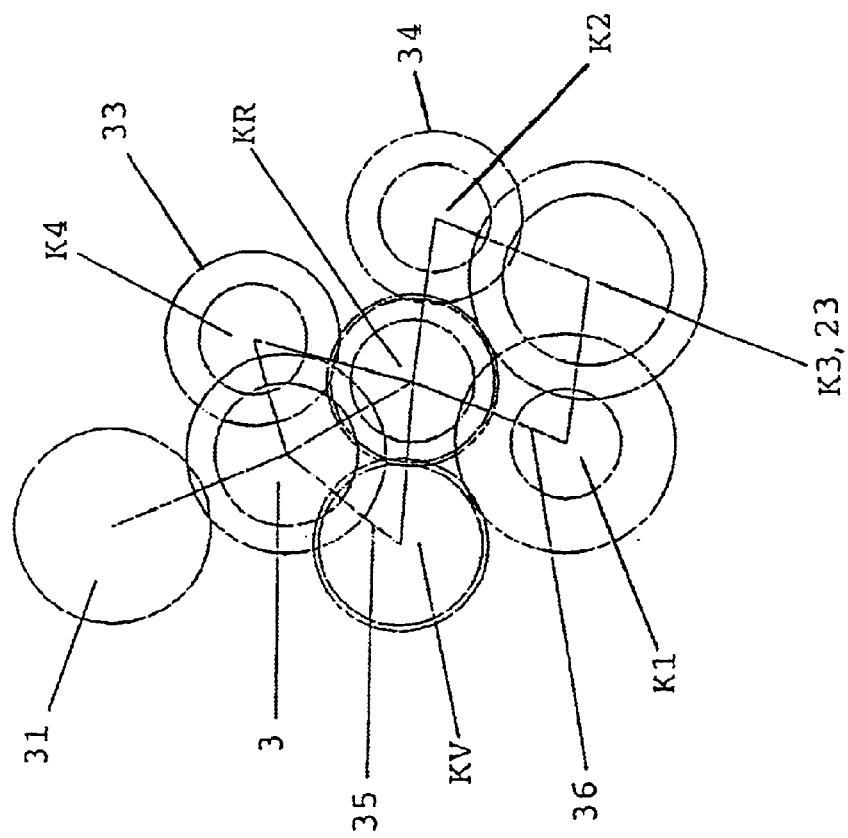
FIG. 3 is a representation of the shaft arrangement of an inventive reversing transmission with short center distance.

In FIG. 3 is diagrammatically shown the spatial distribution of the shafts of the inventive reversing transmission. Upon one side of the periphery of the input shaft 3 are situated the countershaft units of the forward gear KV, those of the reverse gear KR and of the fourth gear K4 which form the reversing transmission unit 33. The countershaft unit KR is placed between the countershaft units KV and K4. The other side of the input shaft 3 remains free. The countershaft unit K4 can be easily removed from the arrangement in this design.

The countershaft units of the gear transmission unit 34 are attached on the free side of the countershaft unit of the reverse gear KR. The countershaft unit K3 with the output shaft 23 are placed between the countershaft units K1 and K2. Accordingly, the gear transmission unit 34 lies behind the reversing transmission unit 33 in relation to the output shaft 23.

Figure 6:
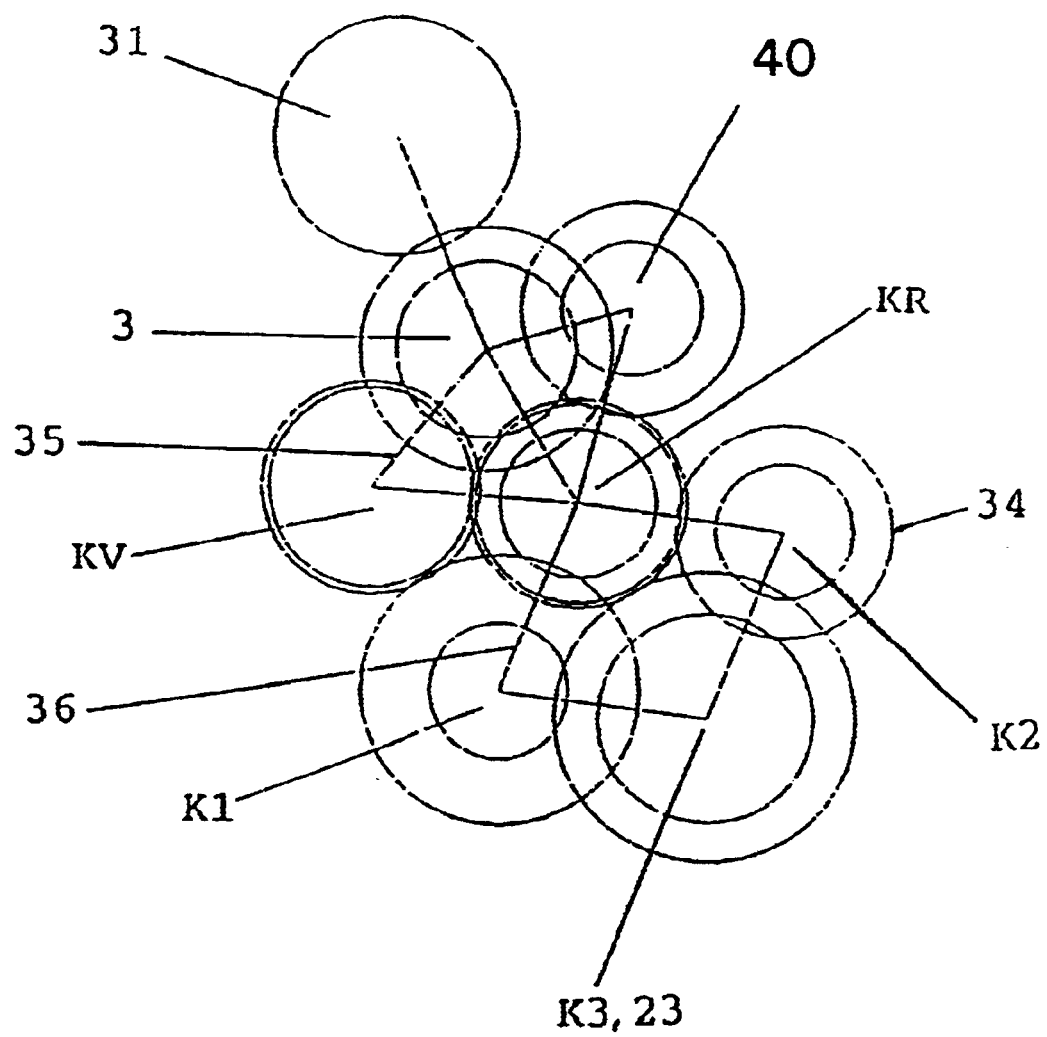
FIG. 6 is a diagrammatic representation, similar to FIG. 3, showing a second auxiliary drive.

An auxiliary input 31 is situated upon the free side of the input shaft 3 opposite to the transmission units 33 and 34. A second auxiliary drive 40 (see FIG. 6) can be provided instead of the countershaft unit K4.

The axles of the shafts of the reversing transmission units KV, KR and K4 and the input shaft 3 form a first quadrilateral 35 and the axles of the shafts of the gear transmission unit K1, K2, K3 and the shaft of the countershaft unit of the reverse gear KR form one other rectangle (second) quadrilateral 36. Depending on the special demands on the reversing transmission during installation in a certain vehicle, the individual countershaft units can be moved relative to each other, the two quadrilaterals 35 and 36 changing their angles.

Figure 4:
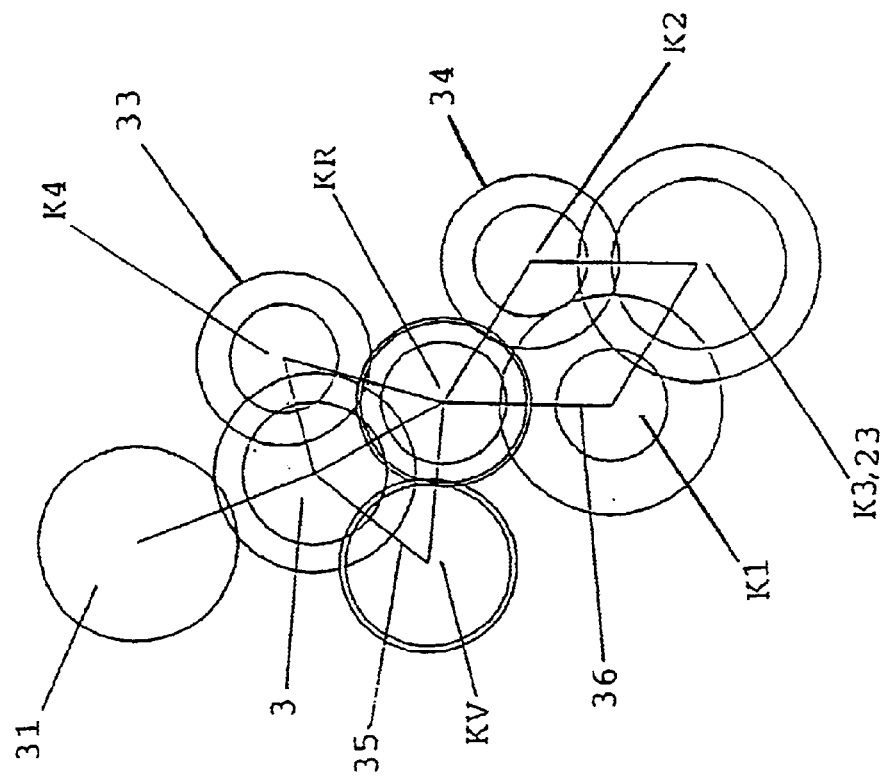
FIG. 4 is a representation of the shaft arrangement of an inventive reversing transmission with long center distance.

In FIG. 3, a shaft arrangement with short center distance between the input shaft 3 and the output shaft 23 is shown. In FIG. 4, on the other hand, a shaft arrangement with long center distance is shown. In this embodiment of the inventive reversing transmission, the quadrilateral 36 is stretched in length compared to the embodiment of FIG. 2. Thereby the output shaft 23 and thus the countershaft unit of the third gear K3 remove themselves from the countershaft unit of the reverse gear KR and a larger center distance results.

Figure 5:
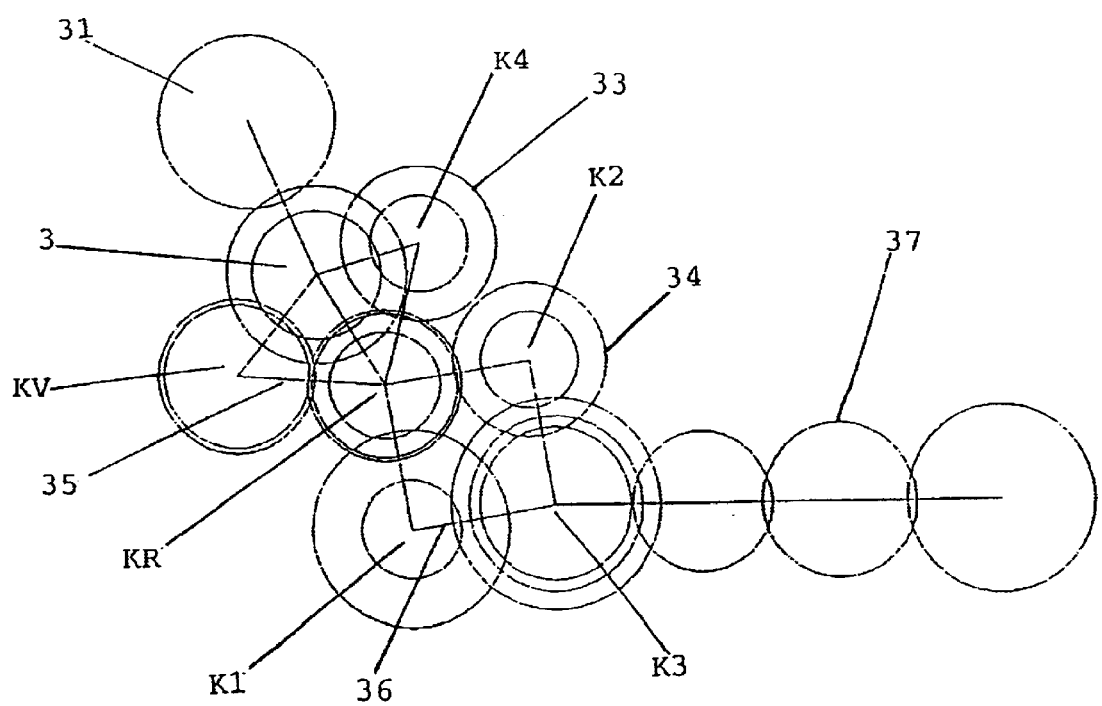
FIG. 5 is a diagrammatic representation of an inventive reversing transmission with power divider transmission.

In FIG. 5, a reversing transmission is shown which is provided with a power divider transmission 37 for bridging greater distances. In the shape shown, the power divider transmission has four shafts, but any other design of power divider transmission can be used.

It is also possible to swing the gear transmission unit attached to the countershaft unit KR within the free space on the periphery of the countershaft 5. In the same way, the reversing transmission unit 33 can be swung along the periphery of the input shaft 3. In FIG. 4, the gear transmission unit 34, turned in direction of the countershaft unit K4, is shown by way of example. In this manner, the inventive reversing gear can be easily adapted to the structural peculiarities of a vehicle.

| Reference numerals | |
|---|---|
| 1 | reversing transmission |
| 2 | torque converter |
| 3 | input shaft |
| 4 | fixed gear |
| 5 | countershaft |
| 6 | countershaft |
| 7 | countershaft |
| 8 | countershaft |
| 9 | countershaft |
| 10 | idler gear |
| 11 | clutch element |
| 12 | fixed gear |
| 13 | fixed gear |
| 14 | idler gear |
| 15 | clutch element |
| 16 | fixed gear |
| 17 | idler gear |
| 18 | clutch element |
| 19 | fixed gear |
| 20 | idler gear |
| 21 | clutch element |
| 22 | fixed gear |
| 23 | output shaft |
| 24 | clutch element |

-continued

| Reference numerals | |
|---|---|
| 25 | fixed gear |
| 26 | idler gear |
| 27 | idler gear |
| 28 | clutch element |
| 29 | fixed gear |
| 30 | hollow shaft |
| 31 | auxiliary drive |
| 32 | hydraulic pump |
| 33 | reversing transmission unit |
| 34 | gear transmission unit |
| 35 | quadrilateral |
| 36 | quadrilateral |
| 38 | power divider transmission |
| KV | countershaft unit forward gear |
| KR | countershaft unit reverse gear |
| K1 | countershaft unit first gear |
| K2 | countershaft unit second gear |
| K3 | countershaft unit third gear |
| K4 | countershaft unit fourth gear |
| AN | input shaft |

What is claimed is:

1. A powershift multi-gear reversing transmission comprising an input shaft, an output shaft and a plurality of countershafts having idler gears, fixed gears and gear clutches distributed thereon to form several countershaft units (KR, KV, K1, K2, K3, K4) for obtaining a desired gear ratio and drive direction for the reversing transmission;
    wherein the shafts and countershafts are combined to form a reversing transmission unit (33) (Ky, KR, K4) and a gear transmission unit (34) (k1, K2, K3), the reversing transmission unit (33) and the gear transmission unit (34) are successively disposed on one side of the input shaft (3) with the gear transmission unit (34) attached to the reversing transmission unit (33); and
    the gear transmission unit (34) is provided on a free portion of a periphery of the countershaft (5) forming a reverse gear (KR).

2. The reversing transmission according to claim 1, wherein a power distributor transmission (37) is attached to the output shaft (23) of the reversing transmission.

3. The reversing transmission according to claim 1, wherein the countershaft unit of a fourth gear (K4) is located adjacent the input shaft (3).

4. The reversing transmission according to claim 1, wherein the countershaft unit of a fourth gear (K4) is removable from the reversing transmission (1) without disturbing a remainder of the reversing transmission.

5. The reversing transmission according to claim 1, wherein an auxiliary input (31) is located adjacent the input shaft (3).

6. The reversing transmission according to claim 5, wherein a rotational input of the auxiliary input (31) is engine dependent.

7. The reversing transmission according to claim 1, wherein reversing transmission includes an auxiliary output which is substituted for a countershaft unit of a fourth gear (K4).

8. A powershift multi-gear reversing transmission comprising an input shaft, an output shaft and a plurality of countershafts having idler gears, fixed gears and gear clutches distributed thereon to form several countershaft units (KR, KV, K1, K2, K3, K4) for obtaining a desired gear ratio and drive direction for the reversing transmission;
    wherein the shafts and countershafts are combined to form a reversing transmission unit (33) (KV, KR, K4) and a gear transmission unit (34) (K1, K2, K3), the reversing transmission unit (33) and the gear transmission unit (34) are successively disposed on one side of the input shaft (3) with the gear transmission unit (34) attached to the reversing transmission unit (33); and
    axles of three countershafts (5, 6, 9) of the reversing transmission unit (33) and an axle of the input shaft (3) form a first quadrilateral (35) and axles of three shafts (7, 8, 23) of the gear transmission unit (34) and one axle of the reversing transmission unit (33) form a second quadrilateral (36), and angles of the first and second quadrilateral (35, 36) are variable depending upon the demands of the reversing transmission.

9. The reversing transmission according to claim 8, wherein a power distributor transmission (37) is attached to the output shaft (23) of the reversing transmission.

10. The reversing transmission according to claim 8, wherein the countershaft unit of a fourth gear (K4) is located adjacent the input shaft (3).

11. The reversing transmission according to claim 8, wherein the countershaft unit of a fourth gear (K4) is removable from the reversing transmission (1) without disturbing a remainder of the reversing transmission.

12. The reversing transmission according to claim 8, wherein an auxiliary input (31) is located adjacent the input shaft (3).

13. The reversing transmission according to claim 12, wherein a rotational input of the auxiliary input (31) is engine dependent.

14. The reversing transmission according to claim 8, wherein reversing transmission includes an auxiliary output which is substituted for a countershaft unit of a fourth gear (K4).

* * * * *